(12) United States Patent
El-Gamal et al.

(10) Patent No.: US 7,684,509 B2
(45) Date of Patent: *Mar. 23, 2010

(54) METHOD AND SYSTEM FOR UTILIZING SPACE-TIME OVERLAYS FOR CONVOLUTIONALLY CODED SYSTEMS

(75) Inventors: Hesham El-Gamal, Dublin, OH (US); A. Roger Hammons, Jr., N. Potomac, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/252,394

(22) Filed: Oct. 18, 2005

(65) Prior Publication Data

US 2006/0034387 A1 Feb. 16, 2006

Related U.S. Application Data

(63) Continuation of application No. 10/012,950, filed on Nov. 7, 2001, now Pat. No. 7,010,054.

(60) Provisional application No. 60/249,553, filed on Nov. 17, 2000.

(51) Int. Cl.
H04L 1/02 (2006.01)

(52) U.S. Cl. .................... 375/267; 375/299; 375/346

(58) Field of Classification Search ............... 375/144, 375/147, 148, 267, 299, 346, 347
See application file for complete search history.

(56) References Cited

U.S. PATENT DOCUMENTS

| 6,127,971 | A  | * | 10/2000 | Calderbank et al. | ......... 342/368 |
| 6,804,307 | B1 | * | 10/2004 | Popovic | ..................... 375/299 |
| 2002/0090035 | A1 | * | 7/2002 | Seshadri et al. | |
| 2003/0095587 | A1 | * | 5/2003 | Schilling | |

* cited by examiner

Primary Examiner—Dac V Ha

(57) ABSTRACT

A communication system for transmitting encoded signals over a communication channel is disclosed. The system includes a transmitter, which has a source that is configured to output a message signal, and an encoder that is configured to generate a code word in response to the message signal. The code word has a construction that is based upon a single dimensional binary code and that specifies a space-time overlay having a predetermined constraint. The transmitter also includes a modulator that is configured to modulate the code word for transmission over the communication channel. Further, the transmitter includes multiple transmit antennas that are configured to transmit the modulated code word over the communication channel. The system also includes a receiver, which may include multiple receive antennas. The receiver is configured to receive the transmitted code word via the multiple receive antennas.

24 Claims, 10 Drawing Sheets

METHOD AND SYSTEM FOR UTILIZING SPACE-TIME OVERLAYS FOR CONVOLUTIONALLY CODED SYSTEMS

CROSS-REFERENCES TO RELATED APPLICATION

This application is a continuation application of U.S. patent application Ser. No. 10/012,950 filed Nov. 7, 2001 now U.S. Pat. No. 7,010,054, entitled "Method and System for Utilizing Space-Time Overlays for Convolutionally Coded Systems". This application is related to, and claims the benefit of the earlier filing date of U.S. Provisional Patent Application, Ser. No. 60/249,553, filed Nov. 17, 2000, entitled "Method and Constructions for Space-Time Codes for Block Fading Channels," the entirety of which is incorporated herein by reference.

BACKGROUND OF THE INVENTION

1. Field of the Invention

The present invention relates to coding in a communication system, and is more particularly related to space-time codes having spatial diversity and temporal diversity.

2. Discussion of the Background

Given the constant demand for higher system capacity of wireless systems, multiple antenna systems have emerged to increase system bandwidth vis-á-vis single antenna systems. In multiple antenna systems, data is parsed into multiple streams, which are simultaneously transmitted over a corresponding quantity of transmit antennas. At the receiving end, multiple receive antennas are used to reconstruct the original data stream. To combat the detrimental effects of the communication channel, communication engineers are tasked to develop channel codes that optimize system reliability and throughput in a multiple antenna system.

Almost all digital wireless communication systems employ some form of channel coding to protect the raw data from channel noise and multi-path fading effects. In single transmit antenna systems, channel coding only adds temporal redundancy to the raw data aiming to exploit the temporal diversity provided by time varying wireless fading channels. The availability of multiple transmit antennas allows for an additional degree of freedom in code design. Space-time coding was introduced in by Tarokh et al. [1] as a two dimensional coding paradigm that exploits the spatial diversity provided by multiple transmit antennas in quasi-static flat fading channels.

To minimize the effects of the communication channel, which typically is Rayleigh, space-time codes have been garnered significant attention. Rayleigh fading channels introduce noise and attenuation to such an extent that a receiver may not reliably reproduce the transmitted signal without some form of diversity; diversity provides a replica of the transmitted signal. Space-time codes are two dimensional channel codes that exploit spatial transmit diversity, whereby the receiver can reliably detect the transmitted signal. Conventional designs of space-time codes have focused on maximizing spatial diversity in quasi-static fading channels and fast fading channels. However, real communication systems exhibit channel characteristics that are somewhere between quasi-static and fast fading. Accordingly, such conventional space-time codes are not optimized.

Further, other approaches to space-time code design assume that channel state information (CSI) are available at both the transmitter and receiver. Thus, a drawback of such approaches is that the design requires the transmitter and receiver to have knowledge of the CSI, which increases implementation costs because of the need for additional hardware. Moreover, these approaches view the transmit diversity attending the use of space-time codes as a substitute for time diversity; consequently, such space-time codes are not designed to take advantage of other forms of diversity.

Based on the foregoing, there is a clear need for improved approaches for providing space-time codes that can be utilized in a multi-input multi-output (MIMO) block fading channel. There is also a need to design space-time codes that can exploit spatial diversity as well as time diversity. There is also a need to improve system reliability without reducing transmission rate. There is a further need to simplify the receiver design. Therefore, an approach for constructing space-time codes that can enhance system reliability and throughput in a multiple antenna system is highly desirable.

SUMMARY OF THE INVENTION

The present invention addresses the above stated needs by providing space-time overlay codes to optimally exploit the spatial and temporal diversity available in a communication channel. In an exemplary embodiment, these space-time overlay codes are implemented to upgrade convolutionally coded single antenna wireless communication systems. The algebraic framework to construct these convolutional space-time overlays that achieve full spatial diversity in quasi-static fading channels without altering the signal transmitted from the first antenna is developed. For BPSK modulated systems, a general approach for constructing space-time overlay codes with the same trellis complexity as the code used in the single antenna system is provided. The general approach for QPSK modulated systems involves the use of systematic inner space-time codes that utilize separate soft input/soft output decoders at the receiver. For QPSK modulated systems using rate 1/n binary convolutional codes with Gray mapping, an alternative space-time construction with the same trellis complexity as the single dimensional convolutional code is developed. The framework for constructing algebraic space-time overlays, according to an embodiment of the present invention, extends to block coded systems.

According to one aspect of the invention, a method for transmitting encoded signals over a communication channel of a communication system having a plurality of transmit antennas and a plurality of receive antennas is provided. The method includes receiving a message signal, and generating a code word in response to the message signal. The code word has a construction that is based upon a single dimensional binary code and that specifies a space-time overlay having a predetermined constraint. Under this approach, spatial diversity and temporal diversity are enhanced, without sacrificing transmission rate.

According to another aspect of the invention, an apparatus for encoding signals for transmission over a communication channel of a communication system having a plurality of transmit antennas is provided. The apparatus comprises a source that is configured to output a message signal, and an encoder that is configured to generate a code word in response to the message signal. The code word has a construction that is based upon a single dimensional binary code and that specifies a space-time overlay having a predetermined constraint. The above arrangement advantageously improves system throughput and system reliability of a communication system.

According to one aspect of the invention, an apparatus for encoding signals for transmission over a communication channel of a communication system having a plurality of transmit antennas is provided. The apparatus includes means for receiving a message signal, and means for generating a code word in response to the message signal. The code word has a construction that is based upon a single dimensional binary code and that specifies a space-time overlay having a predetermined constraint. The above arrangement advantageously provides increased system capacity.

According to another aspect of the invention, a communication system for transmitting encoded signals over a communication channel is disclosed. The system includes a transmitter, which has a source that is configured to output a message signal, and an encoder that is configured to generate a code word in response to the message signal. The code word has a construction that is based upon a single dimensional binary code and that specifies a space-time overlay having a predetermined constraint. The transmitter also includes a modulator that is configured to modulate the code word for transmission over the communication channel. Further, the transmitter includes a plurality of transmit antennas that are configured to transmit the modulated code word over the communication channel. The system also includes a receiver, which has a plurality of receive antennas; the receiver is configured to receive the transmitted code word via the plurality of receive antennas. The above arrangement advantageously maximizes spatial and temporal diversity.

According to another aspect of the invention, a waveform signal for transmission over a communication channel of a communication system having a plurality of transmit antennas and a plurality of receive antennas is disclosed. The waveform signal includes a code word that has a construction that is based upon a single dimensional binary code and that specifies a space-time overlay having a predetermined constraint. The above approach minimizes data transmission errors.

In yet another aspect of the invention, a computer-readable medium carrying one or more sequences of one or more instructions for transmitting encoded signals over a communication channel of a communication system having a plurality of transmit antennas and a plurality of receive antennas is disclosed. The one or more sequences of one or more instructions include instructions which, when executed by one or more processors, cause the one or more processors to perform the step of receiving a message signal. Another step includes generating a code word in response to the message signal. The code word has a construction that is based upon a single dimensional binary code and that specifies a space-time overlay having a predetermined constraint. This approach advantageously provides simplified receiver design.

In yet another aspect of the present invention, an apparatus for receiving signals over a communication channel of a communication system having a plurality of transmit antennas is provided. The apparatus includes a demodulator that is configured to demodulate a signal containing a code word, wherein the code word has a construction that is based upon a single dimensional binary code and that specifies a space-time overlay having a predetermined constraint. The apparatus also includes a decoder that is configured to decode the code word and to output a message signal. Under this approach, the effective bandwidth of the communication system is increased.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to binary phase-shift keying (BPSK) and quadrature phase shift keying (QPSK), the present invention has applicability to other modulations schemes.

Figure 1:
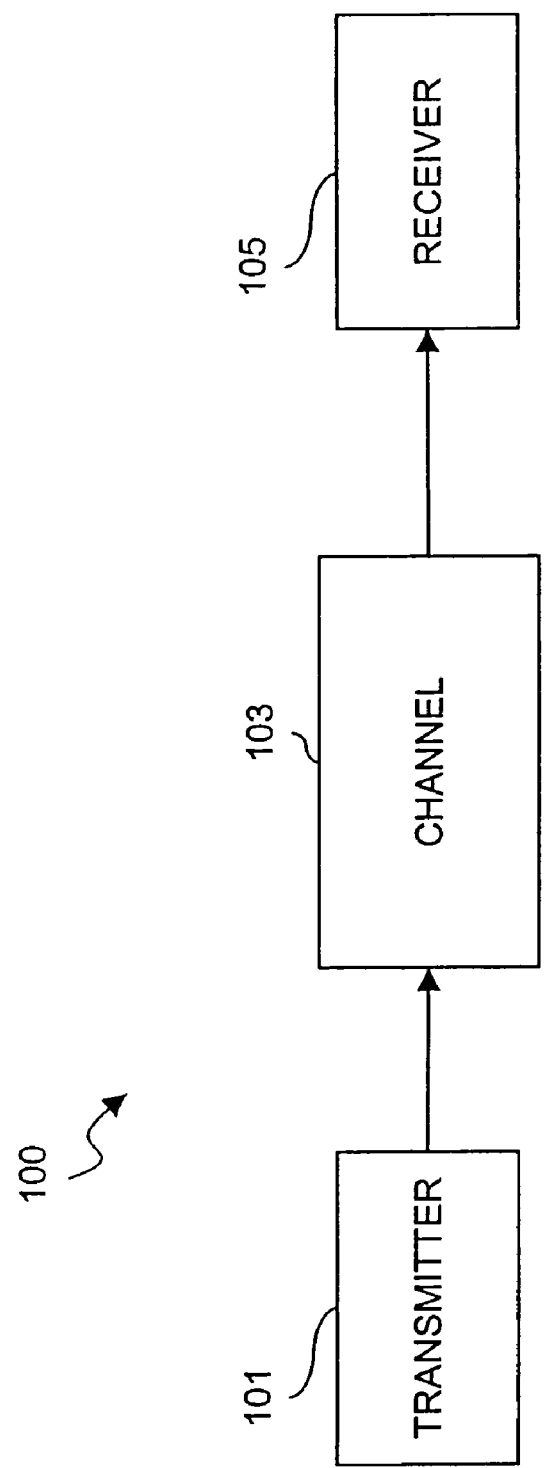
FIG. 1 is a diagram of a communication system configured to utilize space-time codes, according to an embodiment of the present invention.

FIG. 1 shows a diagram of a communication system configured to utilize space-time codes, according to an embodiment of the present invention. A digital communication system 100 includes a transmitter 101 that generates signal waveforms across a communication channel 103 to a receiver 105. In the discrete communication system 100, transmitter 101 has a message source that produces a discrete set of possible messages; each of the possible messages have a corresponding signal waveform. These signal waveforms are attenuated, or otherwise altered, by communications channel 103. As a result, receiver 105 must be able to compensate for the attenuation that is introduced by channel 103. To assist with this task, transmitter 101 employs coding to introduce redundancies that safeguard against incorrect detection of the received signal waveforms by the receiver 105.

The present invention, according to one embodiment, considers the design of space-time overlays to upgrade single antenna wireless communication systems to accommodate multiple transmit antennas efficiently. An overlay constraint is defined such that the signal transmitted from the first antenna in the upgraded system is the same as that in the single antenna system, as more fully described below. The signals transmitted from the remaining antennas of the transmitter 101 are designed according to space-time coding principles to achieve full spatial diversity in quasi-static flat fading channels 103. For both BPSK and QPSK modulated systems, an algebraic design framework that exploits the structure of existing single dimensional convolutional codes in designing overlays that achieve full spatial diversity with minimum additional decoding complexity at the receiver 105. A concatenated coding approach for BPSK overlay design is also developed in which the inner code is an orthogonal block code. This approach yields near optimal performance for quasi-static fading channels. Such an approach may be extended time varying block fading channels.

Conventional space-time code design has not fully considered the limitations and capabilities of existing single antenna wireless systems. On one hand, the optimized physical layer parameters obtained from these traditional designs may not satisfy certain practical constraints imposed on the system for example, certain designs require larger constellation sizes to achieve the same throughput [2]. On the other hand, such designs did not exploit the single dimensional channel coding already employed in almost all practical single antenna systems. In contrast, the design of space-time overlays, according to an embodiment of the present invention, provides for upgrading convolutionally coded single antenna wireless systems to efficiently accommodate multiple transmit antennas. The present invention permits an algebraic design approach that utilizes the structure of single dimensional convolutional codes to construct space-time overlays that achieve full spatial transmit diversity while satisfying a certain overlay constraint. This constraint ensures that the signal transmitted from the first antenna in the upgraded system is the same as that in the single antenna system.

For binary phase-shift keying (BPSK) modulated systems with rate k/n binary convolutional codes, space-time overlays, according to one embodiment of the present invention, are constructed that preserve the same trellis complexity of the single dimensional code. For quadrature phase shift keying (QPSK), the general design approach entails the use of systematic inner codes that achieve full diversity, according to one embodiment of the present invention. This embodiment may impose additional complexity required to decode the inner space-time code, relatively to the BSPK system. However, for the special case of QPSK systems using rate 1/n binary convolutional codes with Gray mapping, a space-time overlay construction, according to one embodiment of the present invention, provides the same trellis complexity as the single dimensional code. Therefore, in most cases, the present invention permits use of a space-time maximum likelihood decoder with the same trellis complexity as a single dimensional decoder.

Although the present invention primarily discusses quasi-static fading channels, it is recognized by one of ordinary skill in the art that the present invention has applicability to time-varying block fading channels as well. Such an extension is based on the framework described in an article by H. El Gamal and A. R. Hammons Jr., entitled "On the Design of Algebraic Space-time Codes for MIMO Block Fading Channels" *IEEE Transactions on Information Theory*, January 2003, which is incorporated herein by reference in its entirety. One important result in this regard, as detailed below, pertains to the inner orthogonal coding approach and its inability to achieve the maximum possible diversity advantage in such channels.

Figure 2:
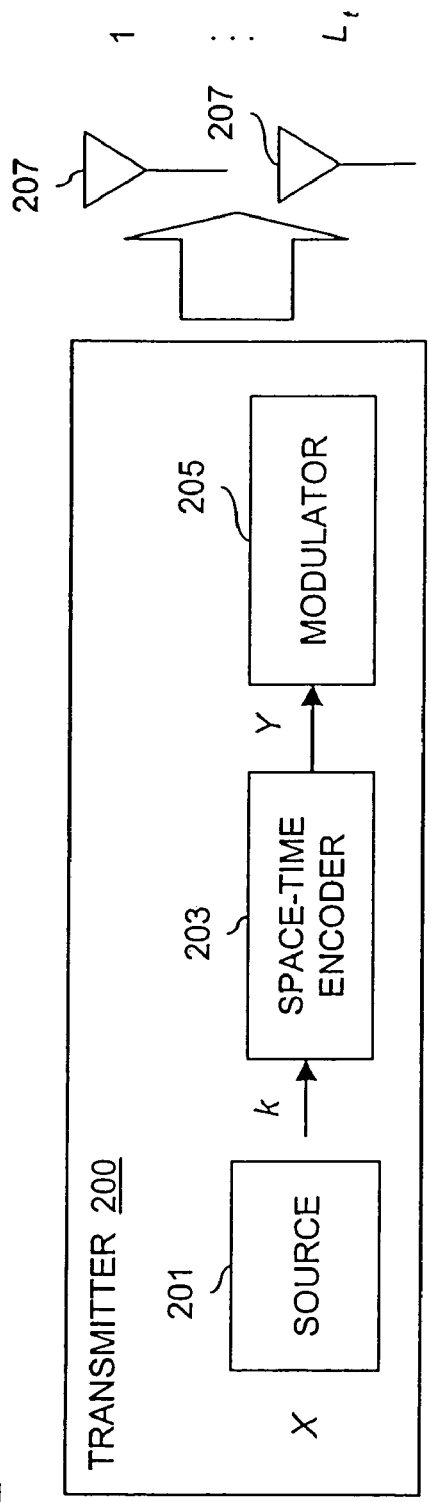
FIG. 2 is a diagram of an encoder that generates space-time codes, in accordance with an embodiment of the present invention.

FIG. 2 shows a diagram of an encoder that generates space-time codes, in accordance with an embodiment of the present invention. A transmitter 200, as mentioned above, possesses a message source 201 that generates k signals from a discrete alphabet, X'. Encoder 203 then generates signals from alphabet Y to a modulator 205. Modulator 205 maps the encoded messages from encoder 203 to signal waveforms that are transmitted to $L_t$ number of antennas 207, which emit these waveforms over the communication channel 103. Accordingly, the encoded messages are segmented into $L_t$ data streams and then simultaneously transmitted over the antennas 207.

Figure 3:
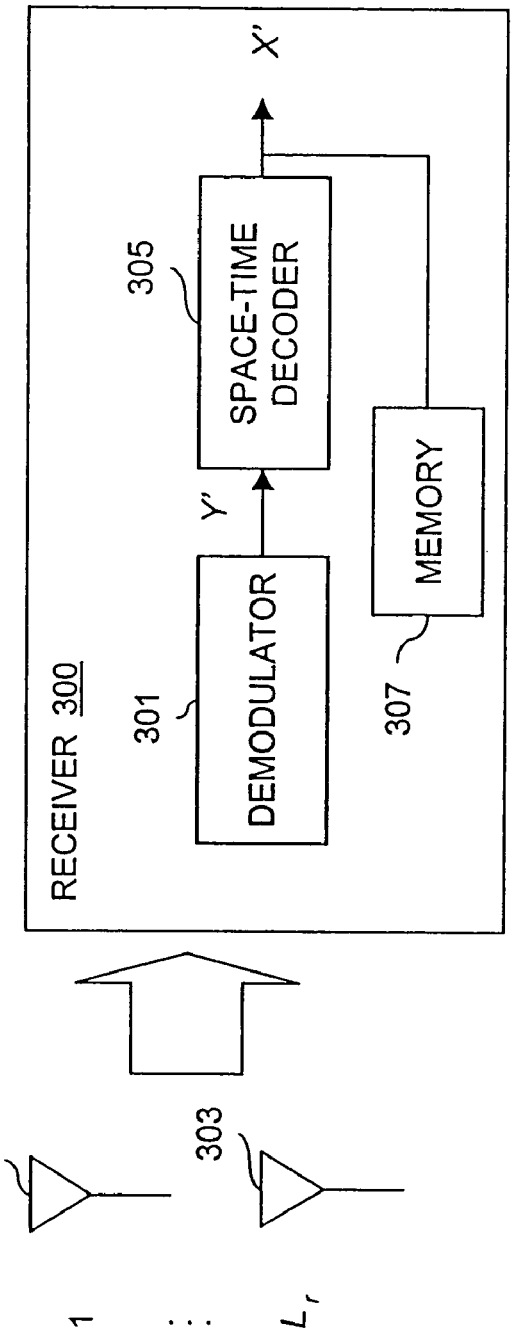
FIG. 3 is a diagram of a decoder that decodes space-time codes, according to an embodiment of the present invention.

FIG. 3 shows a diagram of a decoder that decodes space-time codes, according to an embodiment of the present invention. At the receiving side, a receiver 300 includes a demodulator 301 that performs demodulation of received signals from transmitter 200. These signals are received at multiple antennas 303, which are of a limited number. This scenario represents, for example, the down-link of most wireless systems whereby the number of receive antennas 303 at the terminal is limited by the weight, size, and battery consumption requirements. Accordingly, the space-time code design problem in such systems (e.g., 100) presents a greater engineering challenge than that of systems with a large number of receive antennas 303. In the latter scenario, efficient signal processing algorithms can be exploited to separate the signals transmitted from different antennas at the receiver; this reduces the code design problem to a single dimensional code design in time-varying block fading channels, whereas the environment of the present invention according to one embodiment requires the use of two dimensional codes to account for the mutually interfering transmitted signals. These algorithms are described in a paper by H. El Gamal and A. R. Hammons Jr., entitled, "The layered space-time architecture: a new perspective" to appear *IEEE Trans. Info. Theory*, 1999; which is incorporated herein by reference in its entirety.

After demodulation, the received signals are forwarded to a decoder 305, which attempts to reconstruct the original source messages by generating messages, X'. Receiver 300, according to one embodiment of the present invention, has a memory 307 that stores channel state information (CSI) associated with the communication channel 103. Conventional communication systems typically require that CSI be available at both the transmitter and the receiver. By contrast, the present invention, according to one embodiment, does not require CSI at the transmitter 200, thus, providing a more robust design.

In a traditional single antenna system, the source generates k information symbols from the discrete alphabet X, which are encoded by the error control code $C^{(s)}$ to produce code words of $[c_1^{(s)}, c_2^{(s)}, \ldots, c_{n-1}^{(s)}, c_n^{(s)}]$ length n over the symbol alphabet Y. The modulator mapping function $f: Y \to \Omega$ then maps the encoded symbols into constellation points from the discrete complex-valued signaling constellation $\Omega$ for transmission across the channel. In the multi-antenna system 100, the k information symbols are encoded by the composite error control code C to produce code words of length $N=nL_t$ over the symbol alphabet Y. The encoded symbols are parsed among $L_t$ transmit antennas 207 and, as part of the overlay constraint, mapped by the same modulator $f$ into constellation points. The modulated streams for all antennas 207 are transmitted simultaneously. At the receiver 300, there are $L_r$ receive antennas 303 to collect the incoming transmissions. The received baseband signals are subsequently decoded by the space-time decoder 305. Each spatial channel (the link between one transmit antenna and one receive antenna) is assumed to experience statistically independent flat Rayleigh fading.

A space-time code is defined to include an underlying error control code together with a spatial parsing formatter. An $L_t \times n$ space-time code C of size M includes an $(L_t, n, M)$ error control code C and a spatial parser $\sigma$ that maps each code word vector $\bar{c}$ C to an $L_t \times n$ matrix c whose entries are a rearrangement of those of c. The space-time code C is said to be linear if both C and $\sigma$ are linear. It is assumed that the standard parser maps $$\bar{c} = (c_1^{(1)}, c_1^{(2)}, \ldots, c_1^{(L_t)}, c_2^{(1)}, c_2^{(2)}, \ldots, c_2^{(L_t)}, \ldots, c_n^{(1)}, c_n^{(2)}, \ldots, c_n^{(L_t)}) \in C$$

to the matrix $$c = \begin{bmatrix} c_1^{(1)} & c_2^{(1)} & \ldots & c_n^{(1)} \\ c_1^{(2)} & c_2^{(2)} & \ldots & c_n^{(2)} \\ \vdots & \vdots & \ddots & \vdots \\ c_1^{(L_t)} & c_2^{(L_t)} & \ldots & c_n^{(L_t)} \end{bmatrix}.$$

Base upon the above notation, it is understood that $c_t^{(i)}$ is the code symbol assigned to transmit antenna i at time t. Therefore, the overlay requirement translates to the following constraint $$[c_1^{(s)}, c_2^{(s)}, \ldots, c_{n-1}^{(s)}, c_n^{(s)}] = [c_1^{(1)}, c_2^{(1)}, \ldots, c_{n-1}^{(1)}, c_n^{(1)}] \quad (1)$$

Assuming $s=f(c)$ is the baseband version of the code word as transmitted across the channel 103, the following baseband model of the received signal for the overlay system results:

$$y_t^j = \sqrt{E_s} \sum_{i=1}^{L_t} \alpha_t^{ij} s_t^{(i)} + n_t^j \quad (2)$$

where $\sqrt{E_s}$ is the energy per transmitted symbol; $\alpha_t^{ij}$ is the complex path gain from transmit antenna i (e.g., 207) to receive antenna j (e.g., 303) at time t, $s_t^i = f(c_t^i)$ is the transmitted constellation point from antenna i at time t; $n_t^j$ is the additive white Gaussian noise sample for receive antenna j at time t. The noise samples are independent samples of zero-mean complex Gaussian random variable with variance $N_0/2$ per dimension. The different path gains $\alpha_t^{ij}$ are assumed to be statistically independent. The fading model of interest is that of a quasi-static flat Rayleigh fading process in which the complex fading gains are constant over the same code word and are independent from one code word to the next. Channel state information is assumed to be available a priori only at the receiver 105.

The diversity advantage of a space-time code is defined as the minimum of the absolute value of the asymptotic slope of the pairwise probability of error versus signal-to-noise ratio curve on a log-log scale. The following rank criterion maximizes the spatial diversity advantage provided by the multiple transmit antenna: for the baseband rank criterion, $d = \text{rank}(f(c) - f(e))$ is maximized over all pairs of distinct code words c, $e \in C$. Full spatial transmit diversity is achieved if and only if $\text{rank}(f(c) - f(e)) = L_t$ for all pairs of distinct code words c, $e \in C$. It is noted that in the presence of $L_r$ receive antennas 303, the total diversity advantage achieved by this code in quasi-static fading channels is $L_t L_r$.

With respect to the design of the space-time overlay, a design framework for full diversity space-time codes that satisfy the overlay constraint according to expression (1) and require minimal additional decoding complexity over the single dimensional Viterbi decoder used in the single antenna system is as follows. For the purpose of explanation, a BPSK modulated system is described. For BPSK modulation, the natural discrete symbol alphabet Y is the field $F=\{0, 1\}$ of integers modulo 2. Modulation is performed by mapping the symbol $x \in F$ to the constellation point $s=f(x)\{-1, 1\}$ according to the rule $s=(-1)^x$. The modulation format may include an arbitrary phase offset $e^{i\Phi}$; this property is more fully described in the paper by A. R. Hammons Jr. and H. El Gamal. On the Theory of Space-Time Codes for PSK Modulation. *IEEE Trans. Info. Theory*, March 2000; which is incorporated herein by reference in its entirety. Notationally, the circled operator $\oplus$ is used to distinguish modulo 2 addition from real- or complex-valued (+, −) operations.

The base-band rank criterion does not allow for a systematic approach for designing algebraic space-time codes because it applies to the complex domain rather than the discrete domain in which codes are traditionally designed. The following binary rank criterion is employed to aid the design of algebraic full diversity space-time codes for BPSK modulation; this binary rank criterion is further detailed in a paper by A. R. Hammons Jr. and H. El Gamal, entitled "On the Theory of Space-Time Codes for PSK Modulation", *IEEE Trans. Info. Theory*, March 2000; which is incorporated herein by reference it is entirety. With respect to the binary rank criterion, it is assumed that C is a linear $L_t \times n$ space-time code with underlying binary code C of length $N=nL_t$, where $n \geq L_t$. It is also assumed that every non-zero code word c is a matrix of full rank over the binary field F. Thus, for BPSK transmission over the quasi-static fading channel, the space-time code C achieves full spatial transmit diversity $L_t$.

Next, assuming $C^{(s)}$ denotes the rate k/n binary convolutional code that is used in the single antenna system. The encoder 203 processes k binary input sequences $x_1(t), x_2(t), \ldots, x_k(t)$ and produces n coded output sequences $y_1^{(s)}(t), y_2^{(s)}(t), \ldots, y_n^{(s)}(t)$ which are multiplexed together to form the output code word. A sequence $\{x(t)\}$ is often represented by the formal series $X(D)=x(0)+x(1)D+x(2)D^2+\ldots$ $\{x(t)\} \leftrightarrow X(D)$, which is referred to as a D-transform pair. The action of the binary convolutional encoder 203 is linear and is characterized by the so-called impulse responses $g_{i,1}^{(s)}(t) \leftrightarrow G_{i,j}^{(s)}(D)$ associating output $y_j^{(s)}(t)$ with input $x_i(t)$. Thus, the encoder action is summarized by the matrix equation:

$$Y^{(s)}(D) = X(D) G^{(s)}(D),$$

where $Y^{(s)}(D) = [Y_1^{(s)}(D) Y_2^{(s)}(D) \ldots Y_n^{(s)}(D)]$, $X(D) = [X_1(D) X_2(D) \ldots X_k(D)]$, and $$G^{(s)}(D) = \begin{bmatrix} G_{1,1}^{(s)}(D) & G_{1,2}^{(s)}(D) & \ldots & G_{1,n}^{(s)}(D) \\ G_{2,1}^{(s)}(D) & G_{2,2}^{(s)}(D) & \ldots & G_{2,n}^{(s)}(D) \\ \vdots & \vdots & \ddots & \vdots \\ G_{k,1}^{(s)}(D) & G_{k,2}^{(s)}(D) & \ldots & G_{k,n}^{(s)}(D) \end{bmatrix}.$$

The space-time overlay code C in which the code word $Y^{(i)}(D)$ is transmitted from antenna i is obtained through the action of a rate k/n convolutional encoder 203 with transfer function $G^{(i)}(D)$ on the k-tuple information stream X(D). It is noted that the overlay constraint (1) is satisfied if and only if $G^{(1)}(D) = G^{(s)}(D)$.

The following proposition establishes sufficient conditions on $G^{(1)}(D), \ldots, G^{(L_t)}(D)$ which guarantee that the space-time overlay achieves full spatial transmit diversity $L_t$. With respect to a BPSK overlay construction, $G^{(1)}(D), G^{(2)}(D), \ldots, G^{(L_t)}(D)$ are transfer functions for rate k/n convolutional codes, $n \geq k$; C is a $L_t \times n$ space-time code of dimension k that includes the following code words $$C(D) = \begin{bmatrix} X(D)G^{(1)}(D) \\ X(D)G^{(2)}(D) \\ \vdots \\ X(D)G^{(L_t)}(D) \end{bmatrix},$$

where X(D) denotes the formal series of k arbitrary binary information sequences and $L_t \leq n$. C thus satisfies the binary rank criterion, and consequently, for BPSK transmission over the quasi-static fading channel, achieves full spatial transmit diversity $L_t$, if and only if $G^{(1)}(D), G^{(2)}(D), \ldots, G^{(L_t)}(D)$ have the property that $$\forall \alpha_1, \alpha_2, \ldots, \alpha_{L_t} \epsilon F:$$

$$G(D) = \alpha_1 G^{(1)}(D) \oplus \alpha_2 G^{(2)}(D) \oplus \ldots \oplus \alpha_{L_t} G^{(L_t)}(D)$$

is of rank k over F(the space of all formal series) unless $\alpha_1 = \alpha_2 = \ldots = \alpha_{L_t} = 0$.

Assuming G(D) has rank k over F, then, for $$(X)(D)G(D) = X(D)[\alpha_1 G^{(1)}(D) \oplus \alpha_2 G^{(2)}(D) \oplus \ldots \oplus \alpha_{L_t} G^{(L_t)}(D)]$$

to be equal to 0, one of the following conditions, X(D)=0 or $\alpha_1 = \alpha_2 = \ldots \alpha_{L_t} = 0$, needs to be satisfied. Hence, C satisfies the binary rank criterion.

Further, it is assumed that G(D) has rank less than k over F. Consequently, there is a nonzero X(D) such that $$X(D)G(D) = \alpha_1 X(D)G^{(1)}(D) \oplus \alpha_2 X(D)G^{(2)}(D) \oplus \ldots \oplus \alpha_{L_t} X(D) G^{(L_t)}(D) = 0$$

for $\alpha_1 = \alpha_2 = \ldots \alpha_{L_t} = 0$ other than the all zero case. Hence, C does not satisfy the binary rank criterion.

For the special case in which $C^{(s)}$ is a rate 1/n convolutional code, it is sufficient to choose $G_j^{(1)}, \ldots, G_j^{(L_t)}$ for any single arbitrary j, $1 \leq j \leq n$, according to the stacking construction proposed by A. R. Hammons Jr. and H. El Gamal in "On the Theory of Space-Time Codes for PSK Modulation" (*IEEE Trans. Info. Theory*, March 2000). Use of such a stacking construction ensures that the resulting space-time code achieves full diversity. However, it is more intuitively appealing to construct $G_j^{(1)}, \ldots, G_j^{(L_t)}$ for all j, $1 \leq j \leq n$, according to this stacking construction.

Except for the constraint that $G^{(1)}(D) = G^{(s)}(D)$, no upper bounds are imposed on the constraint lengths of the other transfer functions $G^{(2)}(D), \ldots, G^{(L_t)}(D)$. However, restricting these constraint lengths limits the trellis complexity of the overall space-time code. More specifically, Viterbi decoding can be leveraged for the single antenna code $C^{(s)}$ by limiting the maximum constraint length of $G^{(1)}(D), \ldots, G^{(L_t)}(D)$ to be equal to that of $G^{(s)}(D)$. In this manner, the resulting space-time code has the same trellis complexity as $G^{(s)}(D)$, and the only modification involves changing the branch metric computations of the single antenna Viterbi decoder. The branch metric computations depend on the number of transmit antennas 207 and receive antennas 303 [1].

In the case of QPSK modulation, the natural discrete symbol alphabet Y is the ring $Z_4 = \{0, \pm 1, 2\}$ of integers modulo 4. Modulation is performed by mapping the symbol $x \epsilon Z_4$ to the constellation point $s \epsilon \{\pm 1, \pm i\}$ according to the rule $s = i^x$, where $i = \sqrt{-1}$. It is noted that the absolute phase reference of the QPSK constellation may be chosen arbitrarily without affecting the performance. Since the binary rank criterion developed by A. R. Hammons Jr. and H. El Gamal in "On the Theory of Space-Time Codes for PSK Modulation" (*IEEE Trans. Info. Theory*, March 2000) for QPSK modulated space-time codes pertains to certain projections of the $Z_4$-valued matrix c over the binary field, the following definitions are stated. First, c is defined as a $Z_4$-valued matrix that includes l rows and p columns, which are not multiples of two; after suitable row permutations if necessary, the matrix has the following row structure:

$$c = \begin{bmatrix} c_1 \\ \vdots \\ c_l \\ 2c'_{l+1} \\ \vdots \\ 2c'_{L_t} \end{bmatrix}$$

The row-based indicant projection ($\Xi$-projection) is then defined as follows:

$$\Xi c = \begin{bmatrix} \beta(c_1) \\ \vdots \\ \beta(c_l) \\ \beta(c'_{l+1}) \\ \vdots \\ \beta(c'_{L_t}) \end{bmatrix}$$

where $\beta(c_i)$ is the binary projection of the $Z_4$ vector $c_i$. Similarly, the column-based indicant projection ($\Psi$-projection) is defined as $$[\Psi(c)]^T = [\Xi(c)]^T \qquad (3)$$

The row and column indicant projections serve to indicate certain aspects of the binary structure of the $Z_4$ matrix in which multiples of two are ignored. Using these binary indicants, the following binary rank criterion for QPSK modulated codes is created.

In the QPSK binary rank criterion, C denotes a linear $L_t \times n$ space-time code over $Z_4$ with $n \geq L_t$. For every non-zero $c \epsilon C$, the row-based indicant $\Xi(c)$ or the column-based indicant $\Psi(c)$ has full rank $L_t$ over F. Consequently, for QPSK transmission, the space-time code C achieves full spatial diversity $L_t$.

In conventional single antenna communication systems, binary convolutional codes with optimal free distances $d_{free}$ are used. The encoder output is then mapped to the $Z_4$ alphabet according to the Gray mapping rule (i.e., 00→0, 01→1, 11→2, 10→3). The resulting code maximizes the minimum Hamming distance between any two distinct code words and, hence maximizes the minimum Euclidean distance among the class of codes based on binary convolutional codes.

Taking advantage of the structure of the single dimensional binary code in designing QPSK space-time overlays introduces greater complexity than the BPSK scenario due to the non-linearity of the Gray mapped binary code over the $Z_4$ ring of integers. In this case, the QPSK binary rank criterion only applies to differences between code words which increase the difficulty involved in extracting an algebraic framework for constructing overlays. Therefore, the use of systematic inner space-time codes that satisfy the overlay constraint and achieve full spatial diversity are employed, according to one embodiment of the present invention. The stacking construction, as described in the paper by A. R. Hammons Jr. and H. El Gamal, entitled "On the Theory of Space-Time Codes for PSK Modulation", *IEEE Trans. Info. Theory*, March 2000, can be the basis for constructing systematic inner block or convolutional code achieving full diversity.

It is instructive to discuss the design principle of the inner convolutional code. The coded $Z_4$ output stream $X^{z4}(D)$ after Gray mapping is presented at the input of the inner $Z_4$ rate $1/L_t$ convolutional code $C^{z4}(D)$ with the following $Z_4$ transfer function $$G^{(z4)}(D) = [G_1^{(z4)}(D) G_1^{(z4)}(D) \ldots G_{L^t}^{(z4)}(D)] \qquad (4)$$

In the natural space-time formatting of $C^{z4}(D)$, the output sequence corresponding to $Y_i^{(z4)}(D) = X^{(z4)}(D) G_i^{(z4)}(D)$ is assigned to the i-th transmit antenna 200. This construction satisfies the overlay constraint if and only if $C^{z4}(D)$ is a systematic code (i.e., $G_1^{(z4)}(D)=1$). The resulting space-time code C satisfies the QPSK binary rank criterion under relatively mild conditions on the generator polynomials.

Turning now to the construction of the QPSK overlay, it is assumed that $G_c$ is the $Z_4$ coefficients matrix corresponding to the natural space-time code C associated with the rate $1/L_t$ non-recursive convolutional code $C^{z4}(D)$. Accordingly, C satisfies the QPSK binary rank criterion, and thus achieves full spatial transmit diversity $L_t$ for QPSK transmission, if the binary projection $\beta(G_c)$ has full rank $L_t$ as a matrix of coefficients over the binary field F.

It is noted that one general delay diversity transmission format is a special case of the QPSK overlay construction. Since the condition in the QPSK overlay construction is related to the binary projection of the transfer function, the linear $Z_4$ codes can be obtained by lifting full diversity binary convolutional codes to the $Z_4$ domain (i.e., each 1 in the binary code coefficients matrix can be replaced with either 1 or 3 and each 0 with either 0 or 2). Binary rate $1/L_t$ convolutional codes with optimal $d_{free}$ are good candidates for this application as their associated natural space-time codes typically satisfy the binary rank criteria. Furthermore, these codes have been observed to outperform the best conventional space-time trellis codes, as determined by extensive computer search methods, especially for increasing numbers of antennas. This study is documented by H. El Gamal and A. R. Hammons Jr. (Algebraic Designs for Coherent and Differentially Coherent Space-Time Codes. *Presented at the WCNC*, 2000; which is incorporated herein by reference in its entirety). The desired full diversity inner systematic codes can be obtained by lifting the recursive version of those optimal free distance codes to the $Z_4$ domain.

Joint maximum likelihood decoding of the outer single dimensional code $C^{(s)}$ and the inner systematic space-time code C introduces significant complexity, especially for large number of transmit antennas 207, due to the large number of states in the joint trellis diagram. Fortunately, this does not impose a major obstacle since this coding scheme allows for a straightforward application of the turbo processing architecture [3]. A soft input/soft output decoder can be used for both $C^{(s)}$ and C, and the decoding process should be iterated with soft information passing between the two decoder. A random interleaver may be used to scramble the output stream of $C^{(s)}$ before passing it to C. This is necessary to aid the turbo decoder convergence, and does not affect the diversity advantage achieved by the inner space-time code. Guided by the excellent performance exhibited by this architecture in various applications, it is expected that this receiver offers performance that is very close to maximum likelihood decoding with reasonable complexity.

The added complexity that is required to decode the space-time overlay construction, as described above, can be avoided when $C^{(s)}$ is a rate $1/n$ convolutional code. In this special case, a space-time overlay construction is provided with the same trellis complexity as that of $C^{(s)}$. For the purpose of explanation, the case wherein $C^{(s)}$ is a rate $1/2$ binary convolutional code is considered. The extension to arbitrary rate $1/n$ codes is then described. It is assumed that the two output branches from the encoder $Y_1^{(s)}(D), Y_2^{(s)}(D)$ are grouped according to the Gray mapping rule to form the $Z_4$ stream $Y_{z4}^{(s)}(D)$. The only implication of this assumption is that temporal interleaving has to be performed on a QPSK symbol by symbol basis. Based on the Gray mapping rule, the following relation exists:

$$Y_{z4}^{(s)}(D) = (Y_1^{(s)}(D) \oplus Y_2^{(s)}(D)) + 2Y_2^{(s)}(D) \qquad (5)$$

and hence, $$\beta(Y_{z4}^{(s)}(D)) = Y_1^{(s)}(D) \oplus Y_2^{(s)}(D) = X(D)(G_1^{(s)}(D) \oplus G_2^{(s)}(D)) \qquad 6)$$

Therefore the binary projection of the $Z_4$ stream is equivalent to a rate $1/2$ convolutionally encoded stream with the generator polynomial $G_1^{(s)}(D) \oplus G_2^{(s)}(D)$. This observation leads to a second overlay construction, as described below.

In this second QPSK overlay construction, it is assumed that C is a $Z_4$ $L_t \times n$ space-time code obtained by grouping the two output branches from $L_t$ rate $1/2$ binary convolutional encoders $G^{(1)}(D), \ldots, G^{(L_t)}(D)$ according to the Gray mapping rule. Then, for QPSK transmission over the quasi-static fading channel, C satisfies the QPSK binary rank criterion, and hence achieves full spatial diversity if $\forall \alpha_1, \alpha_2, \ldots, \alpha_{L^t} \in$ F:

$$\alpha_1(G_1^{(1)}(D) \oplus G_2^{(1)}(D)) \oplus \alpha_2(G_1^{(2)}(D) \oplus G_2^{(2)}(D)) \oplus \ldots \oplus \alpha_{L^t}(G_1^{(L_t)}(D) \oplus G_2^{(L_t)}(D)) \neq 0$$

unless $\alpha_1 = \alpha_2 = \ldots \alpha_{L^t} = 0$.

It is assumed that $\alpha_1(G_1^{(1)}(D) \oplus G_2^{(1)}(D)) \oplus \alpha_2(G_1^{(2)}(D) \oplus G_2^{(2)}(D)) \oplus \ldots \oplus \alpha_{L^t}(G_1^{(L_t)}(D) \oplus G_2^{(L_t)}(D)) \neq 0$ unless $\alpha_1 = \alpha_2 = \ldots \alpha_{L^t} = 0$. Based on the Gray mapping rule, the two output branches from the encoder $Y_1^{(i)}(D)$ and $Y_2^{(i)}(D)$ that correspond to antenna i, i=1, 2, ..., $L_t$, are grouped to yield $$Y_{z4}^{(i)}(D) = (Y_1^{(i)}(D) \oplus Y_2^{(i)}(D)) + 2Y_2^{(i)}(D).$$

The binary projection of $Y_{z4}^{(i)}(D)$ is $$\beta(Y_{z4}^{(i)}(D)) = Y_1^{(i)}(D) \oplus Y_2^{(i)}(D) = X(D) G_1^{(i)}(D) \oplus G_2^{(i)}(D))$$

for i=1, 2, ..., $L_t$. Therefore, the row-based indicant projection is given by $$\Xi(C(D)) = \begin{bmatrix} \beta(Y_{z4}^{(1)}(D)) \\ \beta(Y_{z4}^{(2)}(D)) \\ \vdots \\ \beta(Y_{z4}^{(L_t)}(D)) \end{bmatrix} = \begin{bmatrix} X(D)(G_1^{(1)}(D) \oplus G_2^{(1)}(D)) \\ X(D)(G_1^{(2)}(D) \oplus G_2^{(2)}(D)) \\ \vdots \\ X(D)(G_1^{(L_t)}(D) \oplus G_2^{(L_t)}(D)) \end{bmatrix}.$$

Now, $\forall \alpha_1, \alpha_2, \ldots, \alpha_{L^t} \in$ F:

$$a_1 \beta(Y_{z4}^{(1)}(D)) \oplus a_2 \beta(Y_{z4}^{(2)}(D)) \oplus \ldots \oplus a_{L_t} \beta(Y_{z4}^{(L_t)}(D)) =$$

-continued $$a_1 X(D)(G_1^{(1)}(D) \oplus G_2^{(1)}(D)) \oplus \ldots \oplus a_{L_t} X(D)(G_1^{(L_t)}(D) \oplus G_2^{(L_t)}(D)) =$$
$$X(D) a_1 \lfloor (G_1^{(1)}(D) \oplus G_2^{(1)}(D)) \oplus \ldots \oplus a_{L_t}(G_1^{(L_t)}(D) \oplus G_2^{(L_t)}(D)) \rfloor \neq 0$$

unless $X(D)=\alpha_1=\alpha_2=\ldots\alpha_{L_t}=0$. Hence, $\Xi(C(D))$ has full rank for all non-zero code words. Therefore, C satisfies the QPSK binary rank criterion, and hence, achieves full spatial diversity.

The above second overlay construction implies that it is sufficient to choose $G_1^{(1)}(D) \oplus G_2^{(2)}(D), \ldots, G_1^{(L_t)}(D) \oplus G_2^{(L_t)}(D)$ to ensure that the $Z_4$ code achieves full diversity. By restricting the maximum constraint length of any component in G(D) to be equal to that of $C^{(s)}$, it is readily observed that C has the same trellis complexity as $C^{(s)}$. This second QPSK overlay construction can be easily extended to construct space-time overlays for systems with rate 1/2m codes. For rate 1/(2m+1) codes, the condition in this overlay construction is slightly modified; in this case, the code needs to be represented in a rate 2/2(2m+1) form, wherein the condition for full diversity is that all the linear combinations of the 2×(2m+1) transfer functions resulting from the binary projection operator β must have full rank 2 over the space of all formal series. The trellis diagram of the new representation has four branches coming out of each state; however, the number of branches per decoding bit remains the same as that in the single dimensional code $C^{(s)}$.

The algebraic framework previously discussed encompasses a wide range of convolutional based space-time overlays. All space-time codes within this framework achieve full spatial diversity. The second criterion that determines the performance of space-time codes in quasi-static fading channels is the product distance (coding advantage) which does not affect the asymptotic slope, but results in a shift of the asymptotic performance curve.

In quasi-static fading channels, the product distance η of a space-time code C is defined as the minimum over all distinct pairs of code words c, e ∈ C, of the geometric mean of the eigenvalues of $A=(f(c)-f(e))(f(c)-f(e))^H$. The upper bound on the product distance of the class of linear BPSK space-time codes is now derived. C is a linear full diversity $L_t \times n$ space-time code with underlying binary code C of length $N=nL_t$, where $n \geq L_t$, and free distance $d_{free}$. Then, for BPSK transmission over the quasi-static fading channel, the space-time code product distance η is upper bounded by $$\frac{4d_{free}}{L_t} \left(\text{i.e., } \eta \leq \frac{4d_{free}}{L_t}\right).$$

Assuming $\lambda_1, \ldots, \lambda_{L_t}$ be the eigenvalues of the full rank matrix $A=(f(c)-f(e))(f(c)-f(e))^H$, then $$\sum_{j=1}^{L_t} \lambda_j = trA = 4d_{e,c}, \tag{7}$$

where $d_{e,c}$ is the binary distance between the code words e, c ∈ C, and $$\min_{c,e \in C} \sum_{j=1}^{L_t} \lambda_j = 4d_{free}. \tag{8}$$

Subject to this constraint on the sum of the eigenvalues, the product distance obtained by the optimal parsing function is upper bounded by $$\eta \leq \lambda_1^o = \lambda_2^o = \ldots = \lambda_{L_t}^o = \frac{4d_{free}}{L_t}. \tag{9}$$

Orthogonal space-time codes are particularly appealing because of the simplicity of their maximum likelihood decoder [2]. This simplicity is a result of the orthogonality between the rows of the space-time code word matrix c. It is readily observed that using a slightly modified version of the real orthogonal space-time codes [2]—in which some of the columns are multiplied by (−1) to adjust the sign of the first entry—as inner appliques to upgrade single antenna BPSK modulated systems satisfies the overlay constraint in expression (1). The following result establishes the product distance that can be achieved by this overlay design, which rivals that of the optimal convolutional based space-time overlay with the same constraint length. Interestingly, this near optimal performance is also facilitated by the orthogonality between the rows of the resulting space-time code.

It is assumed that C is a full diversity $L_t \times n$ concatenated space-time code with single dimensional outer code $C^{(s)}$ of length n and inner orthogonal block code of length $L_t$, and $d_{free}^{(s)}$ is the free distance of $C^{(s)}$. Then, for BPSK transmission over the quasi-static fading channel, the product distance of C is $\eta=d_{free}^{(s)}$. The orthogonality between the different rows of $(f(c)-f(e))$ results in a diagonal $A=(f(c)-f(e))(f(c)-f(e))^H$ for all distinct pairs of code words c, e ∈ C. Hence, for the code $\epsilon C^{(s)}$ with the minimum distance separation $d_{free}^{(s)}$, the following expression results:

$$\eta=\lambda_1=\lambda_2=\ldots\lambda_{L_t}=4d_{free}^{(s)} \tag{10}$$

The product distance achieved by the concatenated coding approach and the derived upper bound are compared below in Table 1, for some exemplary scenarios; in particular, a BPSK system with rate 1/2 single dimensional code and optimal free distance.

TABLE 1

| $L_t$ | K | η | Upper Bound |
|---|---|---|---|
| 2 | 3 | 20 | 20 |
| 2 | 4 | 24 | 26 |
| 2 | 5 | 28 | 32 |
| 2 | 6 | 32 | 36 |
| 2 | 7 | 40 | 40 |
| 3 | 3 | 20 | 21 |
| 3 | 4 | 24 | 26 |
| 3 | 5 | 28 | 32 |
| 3 | 6 | 32 | 36 |
| 3 | 7 | 40 | 45 |

In the comparison of Table 1, the constraint lengths of C and $C^{(s)}$ are the same to allow for the same decoder complexity. In all considered cases, it is shown that the concatenated coding approach achieves either optimal or very near optimal performance. It is also worth noting that the same optimality argument for this overlay design approach holds for QPSK modulated systems with only two transmit antennas 207 in quasi-static fading channels.

In block fading channels, the code word is composed of multiple blocks. The fading coefficients are constant over one fading block, but are independent from block to block. The number of facing blocks per code word M can be regarded as a measure of the interleaving delay allowed in the system 100, so that systems subject to a strict delay constraint are usually characterized by a small number of independent blocks [4].

The framework developed above for the quasi-static fading channel, according to the present invention, can be extended to block fading channels using the machinery introduced in (2). The objective in this scenario is to exploit both temporal and spatial diversity available in the system. In such channels, the maximum transmit diversity advantage possible with space-time overlays (without factoring in the effect of the receive antennas 303) is given by the following expression:

$$d_m = \left[L_t M\left(1 - \frac{r}{L_t |\Omega|}\right)\right] + 1, \quad (11)$$

where $L_t$ is the number of transmit antennas 207, M is the number of fading blocks per code word, r is the transmission rate, and is the size of the constellation alphabet. It is interesting to compare this result with the maximum diversity advantage possible for the single antenna system supporting the same transmission throughput [5]:

$$d_s = \left[M\left(1 - \frac{r}{|\Omega|}\right)\right] + 1, \quad (12)$$

where it is clear that $d_m \geq L_t \times d_s$. This inequality suggests that design approaches that are optimized for quasi-static fading channels may not yield the maximum possible diversity advantage for block fading channels. The primary example is the concatenated coding approach with inner block orthogonal space-time codes discussed previously. This approach yields excellent performance in quasi-static fading channels, but suffers degradation in performance in block fading channels. The reason for the degradation is that the simple maximum likelihood decoder dictates that the transmission of a complete inner code word be in the same fading state [2]. This limits the maximum possible diversity advantage to $d_{conc} = L_t \times d_s$.

Table 2 compares $d_{conc}$, $d_m$ for some exemplary scenarios, illustrating the possible diversity advantages of the algebraic overlay approach and the concatenated coding approach in a BPSK system with 0.5 bps/Hz.

TABLE 2

| $L_t$ | M | $d_{conc}$ | $d_m$ |
|---|---|---|---|
| 2 | 1 | 2 | 2 |
| 2 | 2 | 4 | 4 |
| 2 | 3 | 4 | 5 |
| 2 | 4 | 6 | 7 |
| 2 | 5 | 6 | 8 |
| 3 | 1 | 3 | 3 |
| 3 | 2 | 6 | 6 |
| 3 | 3 | 6 | 8 |
| 3 | 4 | 9 | 11 |
| 3 | 5 | 9 | 13 |

Next, the results for the algebraic space-time overlays for convolutionally coded systems are discussed. The search results for algebraic space-time overlays obtained from underlying rate 1/2 and rate 1/3 convolutional codes are presented. In particular, Table 3 shows algebraic overlays for systems with underlying single dimensional rate 1/2 convolutional codes.

Table 3 considers the following parameters: $L_t$=1, 2, 3 transmit antennas 207, and convolutional codes with constraint lengths of K=4, . . . ,7. All codes achieve full diversity for both BPSK and QPSK transmissions (with Gray mapping) over the quasi static fading channel—i.e. they satisfy the BPSK and QPSK rank criteria. Furthermore, with the exception of the constraint length K=5 convolutional code which achieves free distance Of $d_{free}$−1, these codes achieve optimal values of the free distance $d_{free}$.

TABLE 3

| K = ν + 1 | $L_t$ = 1 | $L_t$ = 2 | $L_t$ = 3 |
|---|---|---|---|
| 4 | 15, 17 | 15, 17, 13, 15 | 15, 17, 13, 15, 17, 13* |
| 5 | 23, 35 | 23, 35, 25, 37 | 23, 35, 25, 37, 27, 33 |
| 6 | 53, 75 | 53, 75, 67, 71 | 53, 75, 67, 71, 55, 57 |
| 7 | 133, 171 | 133, 171, 117, 165 | 133, 171, 117, 165, 151, 137 |

In Table 4, space-time overlays are obtained for systems with underlying rate 1/3 convolutional codes, with the following parameters: $L_t$=1, 2 transmit antennas 207, and convolutional codes with constraint lengths K=4, . . . ,7. All codes provide optimal values of $d_{free}$ while achieving full diversity for both BPSK and QPSK transmissions.

TABLE 4

| K = ν + 1 | $L_t$ = 1 | $L_t$ = 2 |
|---|---|---|
| 4 | 13, 15, 17 | 13, 15, 17, 17, 13, 15 |
| 5 | 25, 33, 37 | 25, 33, 37, 35, 27, 35 |
| 6 | 47, 53, 75 | 47, 53, 75, 65, 57, 73 |
| 7 | 133, 145, 175 | 133, 145, 175, 175, 175, 133 |
| 8 | 225, 331, 367 | 225, 331, 367, 277, 263, 355 |

FIGS. 4A-4F show the simulation results for the algebraic convolutional space-time overlays, in accordance with an embodiment of the present invention. These results demonstrate the excellent performance achieved by the codes of the present invention and quantify the possible improvements with increasing numbers of transmit antennas 207. In all the examples, one frame corresponds to 130 transmissions for all antennas 207. The scenario with rate 1/2 single dimensional code is considered, in which the system 100 achieves a spectral efficiency of 0.5 and 1 bits/sec/Hz in the case of BPSK and QPSK modulation, respectively.

Figure 4A:
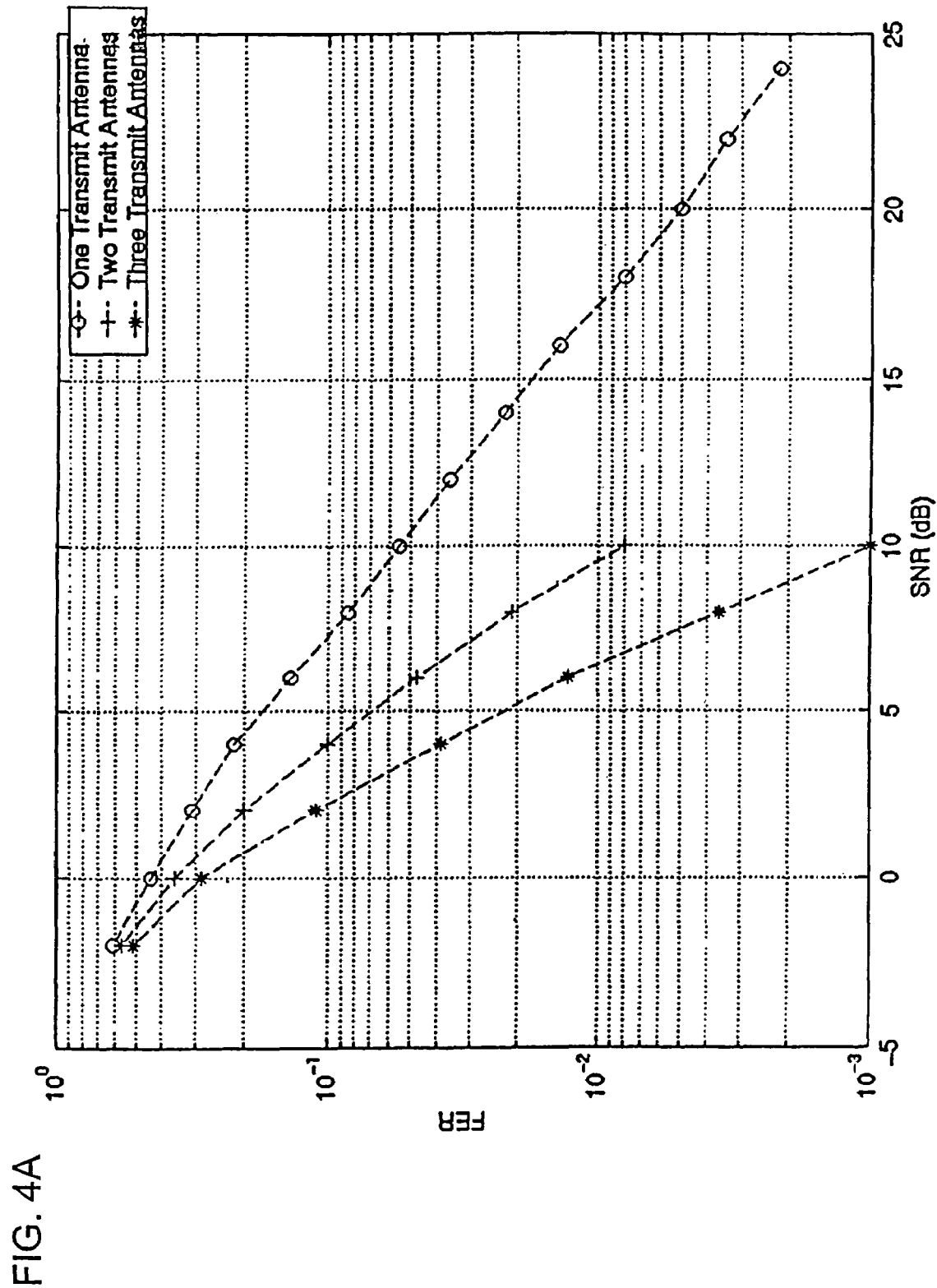
FIGS. 4A-4F are graphs of simulation results of the performance of space-time codes, according to the embodiments of the present invention.
Figure 4B:
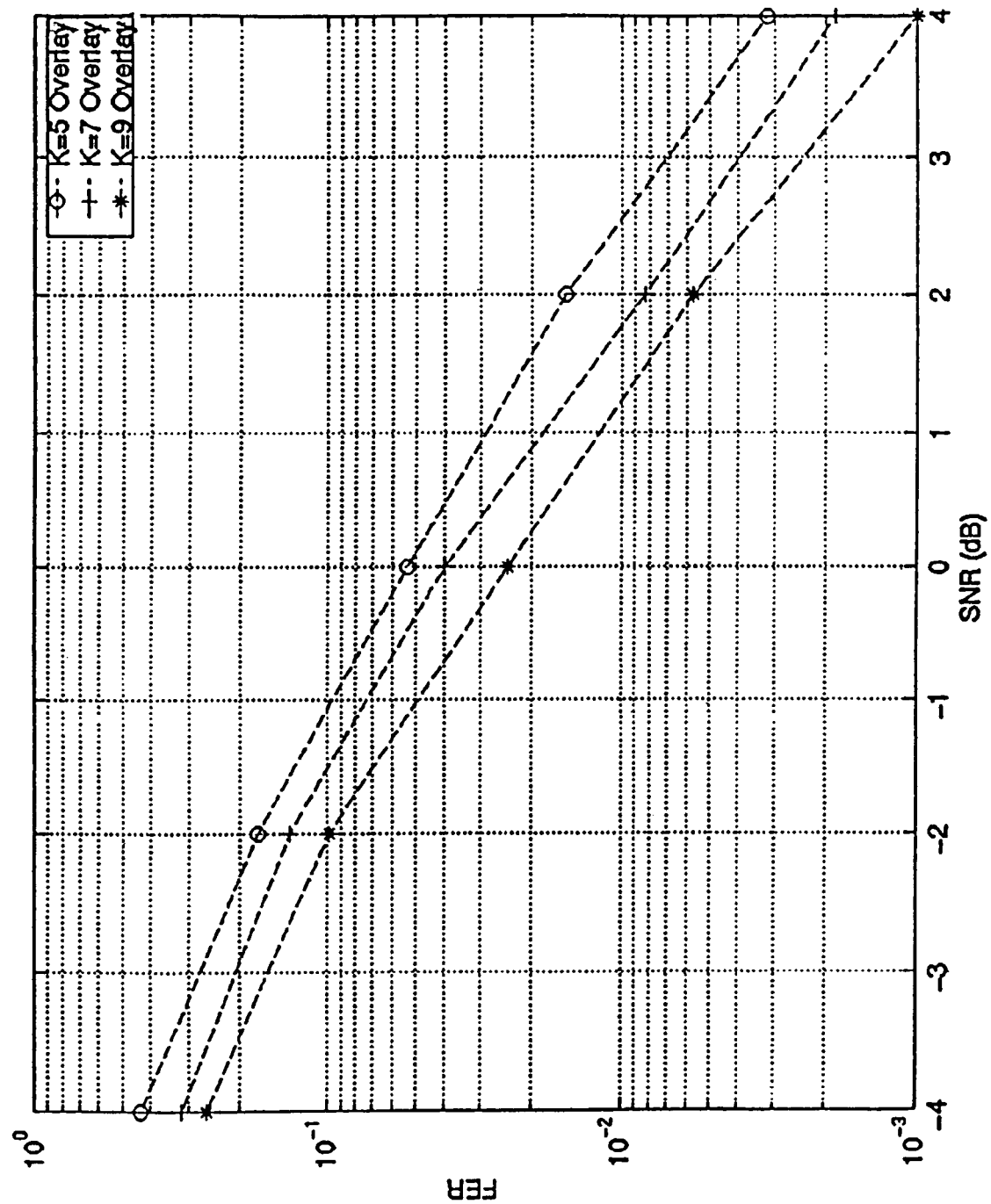
Figure 4C:
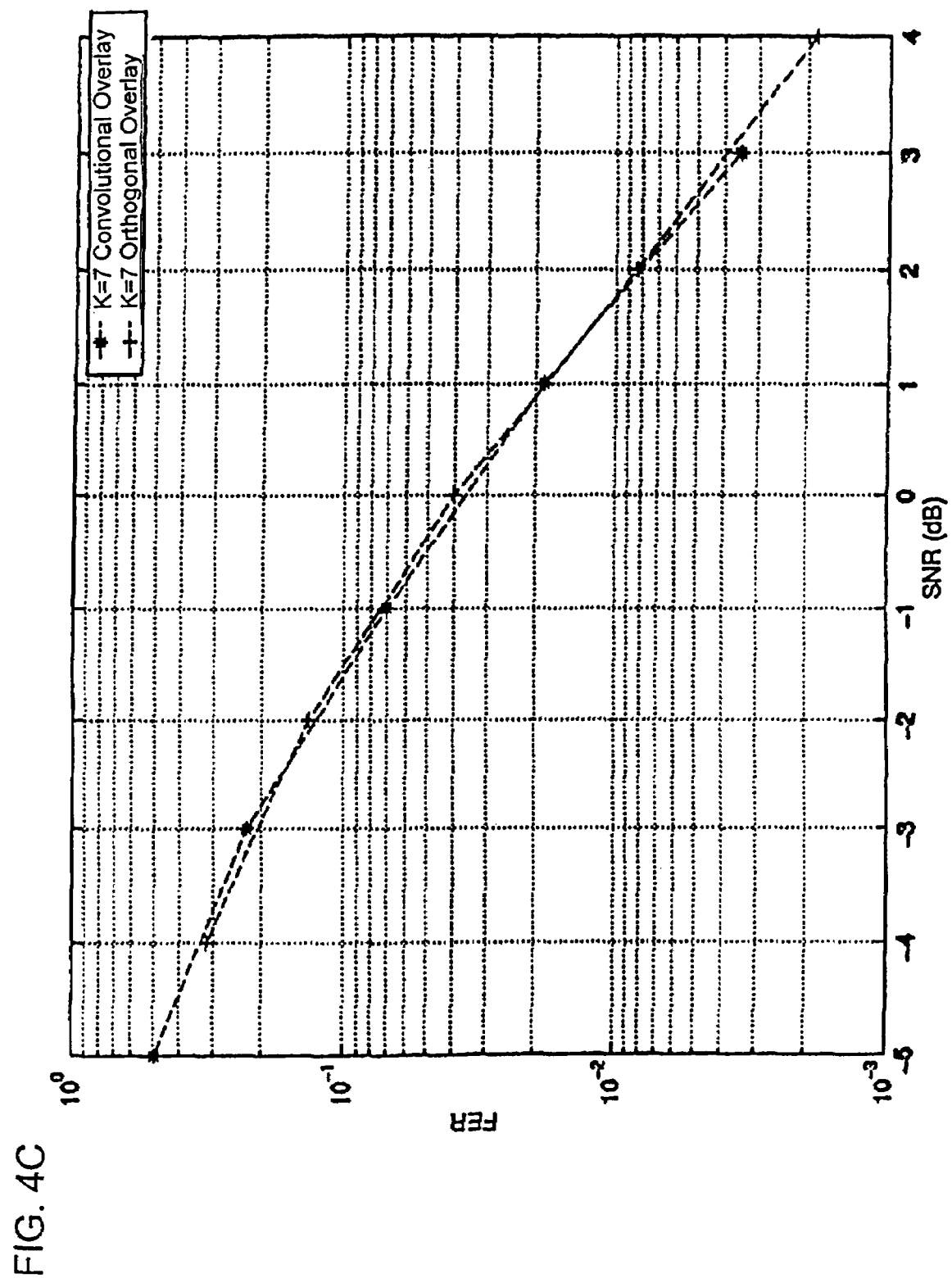

In FIGS. 4A-4C, a BPSK modulated system is considered. FIG. 4A provides performance comparisons for the constraint length 7 algebraic space-time overlays with one, two, and three transmit antennas 207. The number of receive antennas 303 is one in the three cases. It is observed that at a frame error rate (FER) of $10^{-1}$ the systems with two and three transmit antennas 207 provide gains of approximately 3 and 5 dB over the underlying single antenna system. At a FER of $10^{-2}$, the gains of the convolutional space-time overlays with two and three antennas compared to the single antenna system are even higher: 8 dB and 10.5 dB, respectively. In FIG. 4B, the performances of space-time overlays with different constraint lengths are compared for a system with two transmit antennas 207 and two receive antennas 303. The performance of convolutional space-time codes is shown to improve as the constraint length of the code increases. For example, the constraint length K=9 convolutional code outperforms the constraint length K=5 code by 1.5 dB. FIG. 4C compares the performance of the algebraic convolutional space-time overlay and that of the concatenated coding approach with inner orthogonal codes. In this particular scenario, it is observed that both approaches provide identical performance.

Figure 4D:
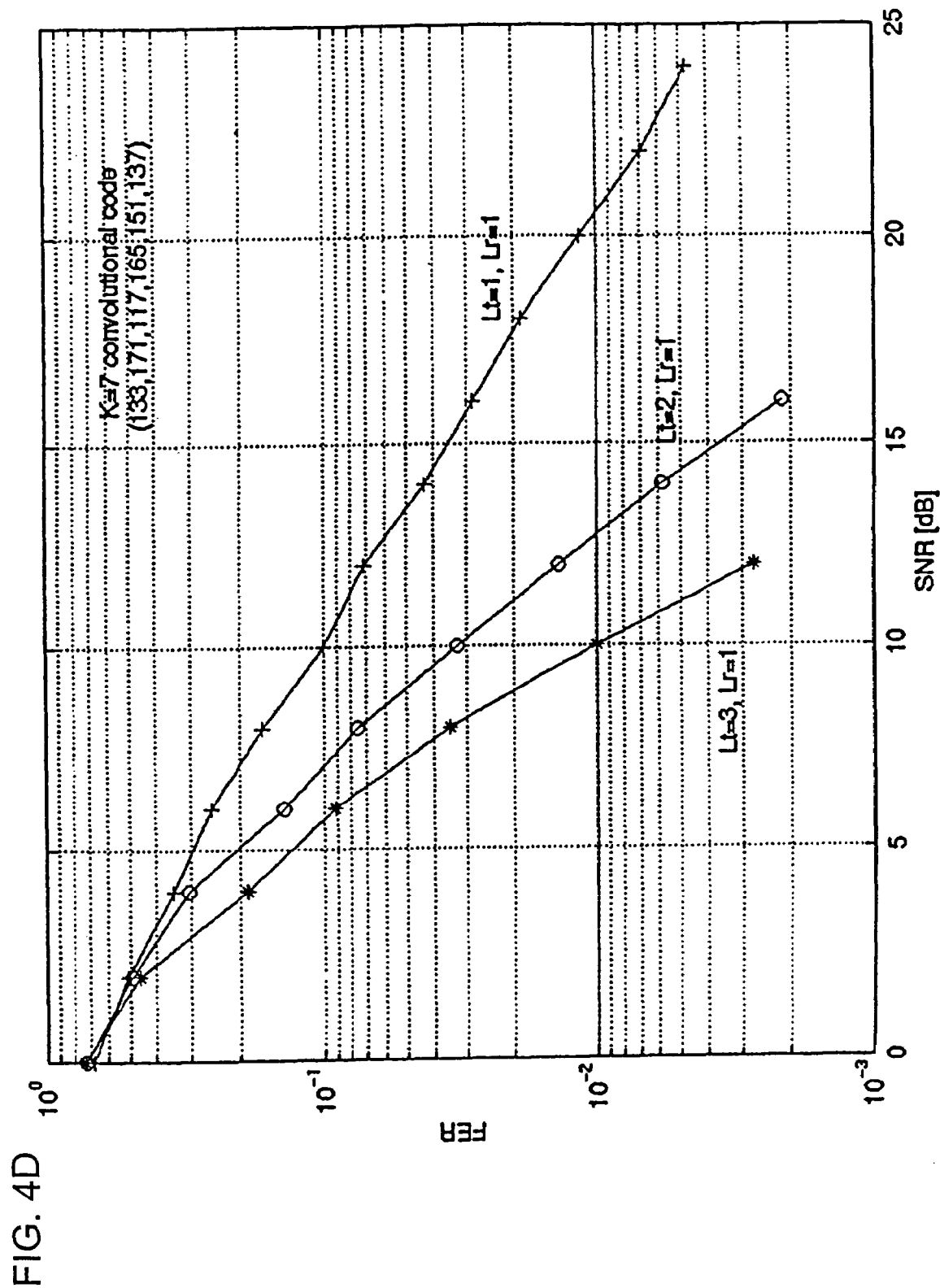
Figure 4E:
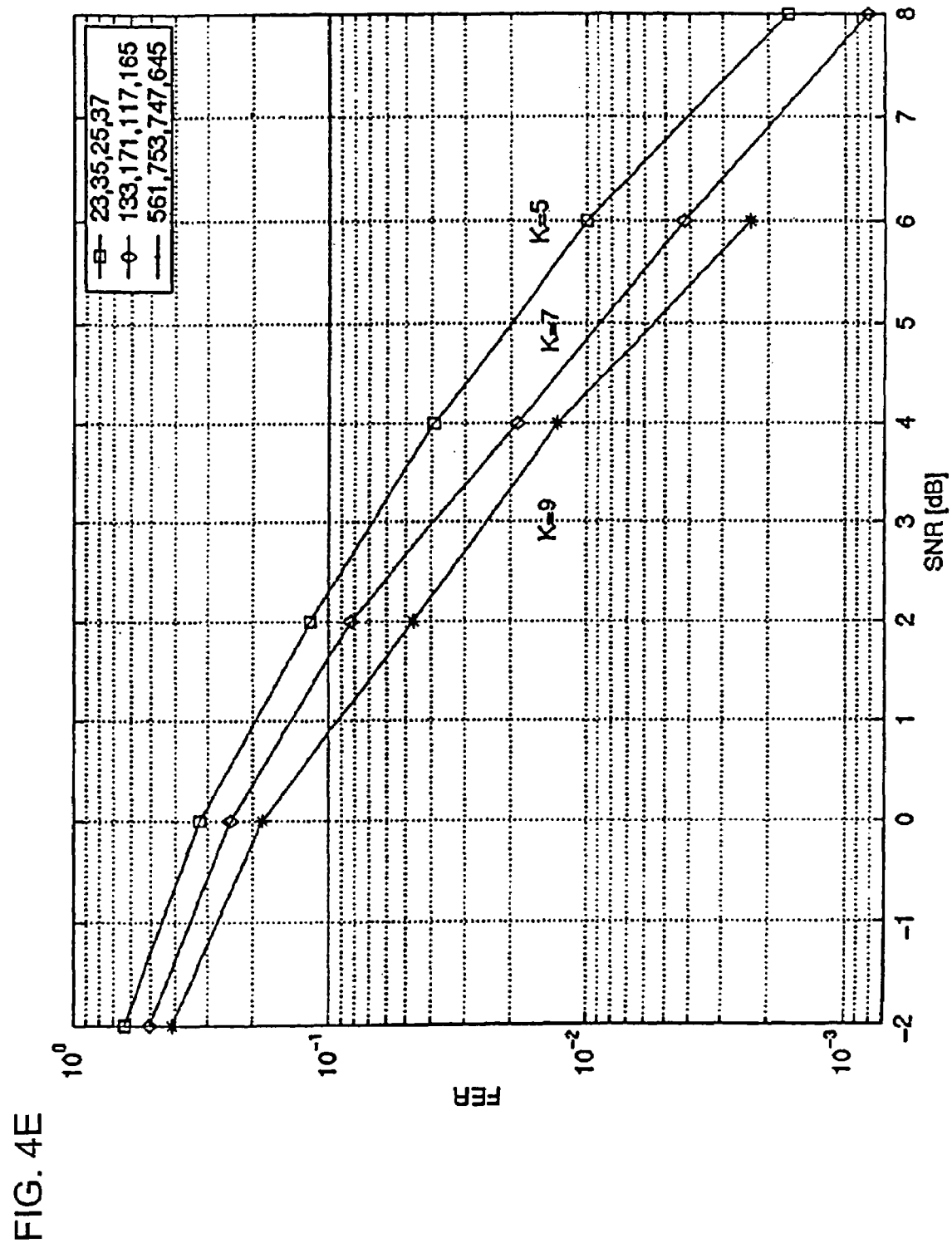
Figure 4F:
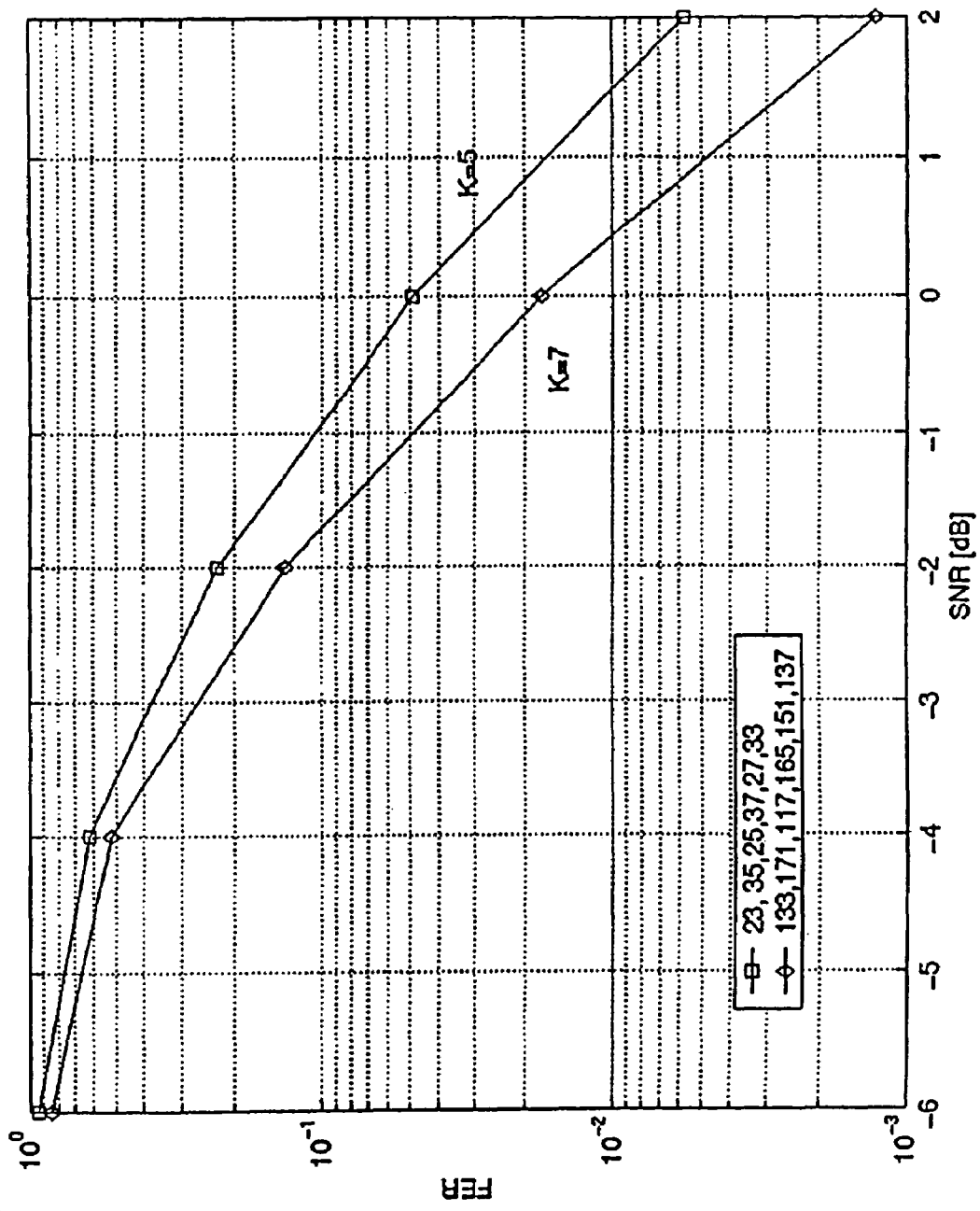

The same comparisons are then repeated for QPSK modulated systems, per FIGS. 4D-4F. In FIG. 4D, the gain obtained by increasing the number of transmit antennas 207 when algebraic space-time overlays are used is quantified. At a frame error rate (FER) of $10^{-1}$, the systems with two and three transmit antennas 207 provide gains of approximately 3 and 4.5 dB, whereas at a FER of $10^{-2}$, the gains increase to 7.5 dB and 10 dB, respectively. FIG. 4E compares the performance of space-time overlays with different constraint lengths in a system with two transmit antennas 207 and two receive antennas 303. It is shown that the constraint length K=9 space-time code outperforms the constraint length K=5 code by 1.5 dB—similar to the BPSK scenario. Finally, the performance of the K=5 and K=7 algebraic overlays is compared in FIG. 4F for the case of three transmit antennas 207 and three receive antennas 303, where it is shown that the K=7 convolutional code outperforms the K=5 code by 1 dB at a FER of $10^{-2}$.

Figure 5:
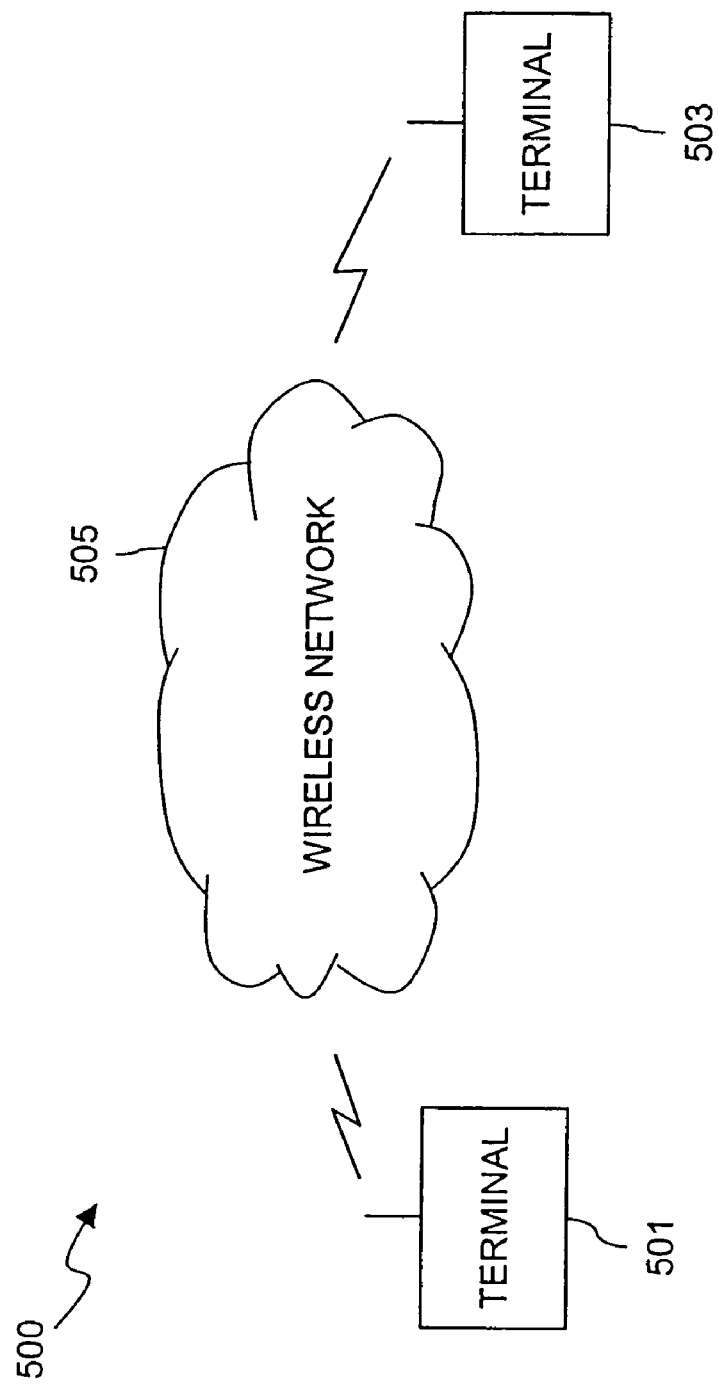
FIG. 5 is a diagram of a wireless communication system that is capable of employing the space-time codes, according to embodiments of the present invention.

The above codes, according to the present invention, have applicability in a number of communication systems; for example, the space-time codes can be deployed in a wireless communication, as seen in FIG. 5.

FIG. 5 shows a diagram of a wireless communication system that utilizes space-times according to an embodiment of the present invention. In a wireless communication system 500, multiple terminals 501 and 503 communicate over a wireless network 505. Terminal 501 is equipped with a space-time encoder 203 (as shown in FIG. 2) that generates the overlay space-time codes. Terminal 501 also includes multiple transmit antennas 207 (as shown in FIG. 2). In this example, each of the terminals 501 and 503 are configured to encode and decode the space-time codes; accordingly, both of the terminals 501 and 503 possess the transmitter 200 and receiver 300. However, it is recognized that each of the terminals 501 and 503 may alternatively be configured as a transmitting unit or a receiving unit, depending on the application. For example, in a broadcast application, terminal 501 may be used as a head-end to transmit signals to multiple receiving terminals (in which only receiving terminal 503 is shown). Consequently, terminal 503 would only be equipped with a receiver 300. The space-time code construction of the present invention advantageously permits use of a smaller number of receive antennas 303 than that of the transmitting terminal 501, thereby resulting in hardware cost reduction. In an exemplary embodiment, a terminal that is designated as a receiving unit may possess a smaller quantity of antennas that of the transmitting unit.

Figure 6:
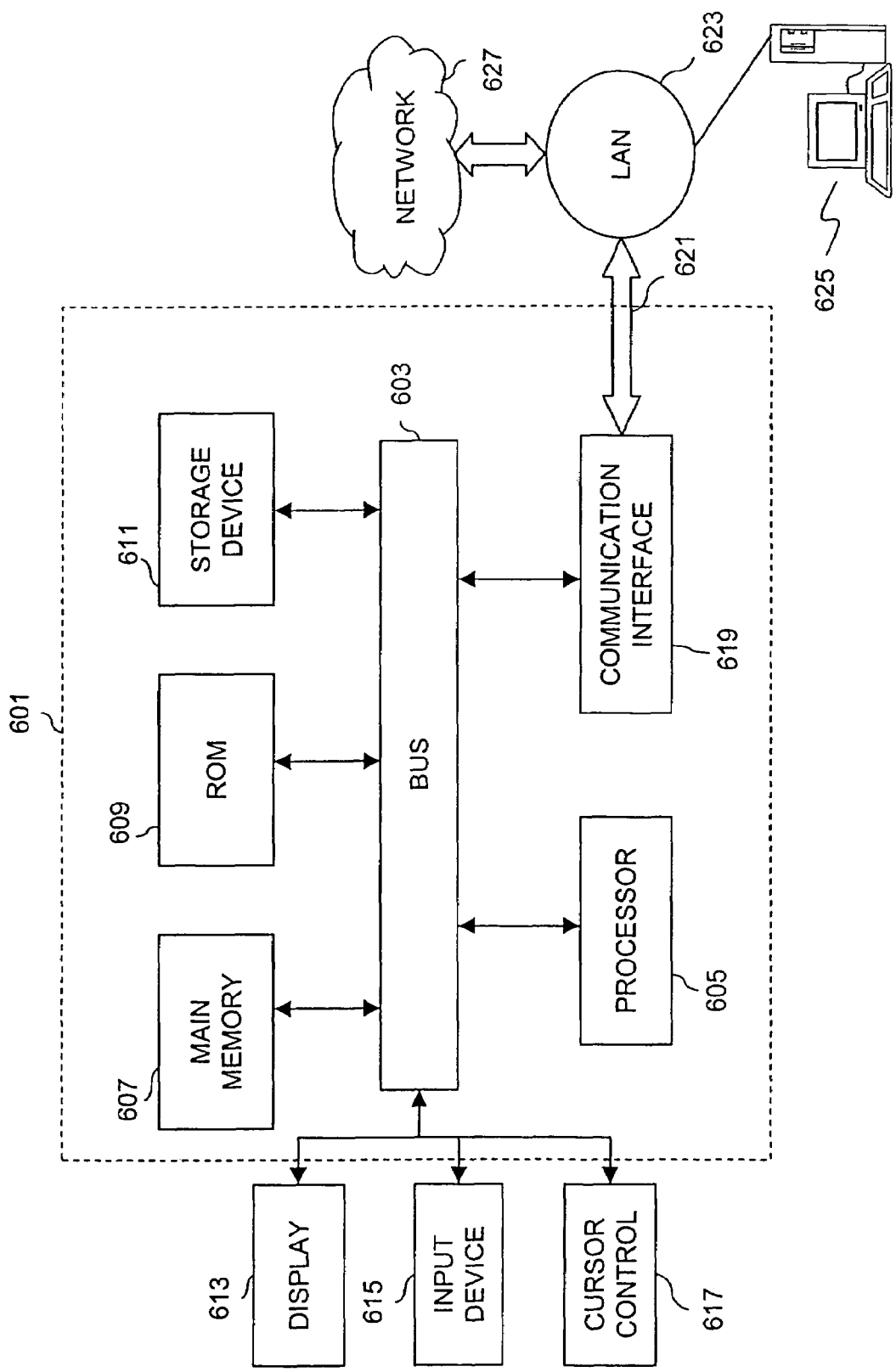
FIG. 6 is a diagram of a computer system that can perform the processes of encoding and decoding of space-time codes, in accordance with an embodiment of the present invention.

FIG. 6 shows a diagram of a computer system that can perform the processes of encoding and decoding of space-time codes, in accordance with an embodiment of the present invention. Computer system 601 includes a bus 603 or other communication mechanism for communicating information, and a processor 605 coupled with bus 603 for processing the information. Computer system 601 also includes a main memory 607, such as a random access memory (RAM) or other dynamic storage device, coupled to bus 603 for storing information and instructions to be executed by processor 605. In addition, main memory 607 may be used for storing temporary variables or other intermediate information during execution of instructions to be executed by processor 605. Computer system 601 further includes a read only memory (ROM) 609 or other static storage device coupled to bus 603 for storing static information and instructions for processor 605. A storage device 611, such as a magnetic disk or optical disk, is provided and coupled to bus 603 for storing information and instructions.

Computer system 601 may be coupled via bus 603 to a display 613, such as a cathode ray tube (CRT), for displaying information to a computer user. An input device 615, including alphanumeric and other keys, is coupled to bus 603 for communicating information and command selections to processor 605. Another type of user input device is cursor control 617, such as a mouse, a trackball, or cursor direction keys for communicating direction information and command selections to processor 605 and for controlling cursor movement on display 613.

According to one embodiment, interaction within system 100 is provided by computer system 601 in response to processor 605 executing one or more sequences of one or more instructions contained in main memory 607. Such instructions may be read into main memory 607 from another computer-readable medium, such as storage device 611. Execution of the sequences of instructions contained in main memory 607 causes processor 605 to perform the process steps described herein. One or more processors in a multi-processing arrangement may also be employed to execute the sequences of instructions contained in main memory 607. In alternative embodiments, hard-wired circuitry may be used in place of or in combination with software instructions. Thus, embodiments are not limited to any specific combination of hardware circuitry and software.

Further, the instructions to support the generation of space-time codes of system 100 may reside on a computer-readable medium. The term "computer-readable medium" as used herein refers to any medium that participates in providing instructions to processor 605 for execution. Such a medium may take many forms, including but not limited to, non-volatile media, volatile media, and transmission media. Non-volatile media includes, for example, optical or magnetic disks, such as storage device 611. Volatile media includes dynamic memory, such as main memory 607. Transmission media includes coaxial cables, copper wire and fiber optics, including the wires that comprise bus 603. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 605 for execution. For example, the instructions may initially be carried on a magnetic disk of a remote computer. The remote computer can load the instructions relating to encoding and decoding of space-time codes used in system 100 remotely into its dynamic memory and send the instructions over a telephone line using a modem. A modem local to computer system 601 can receive the data on the telephone line and use an infrared transmitter to convert the data to an infrared signal. An infrared detector coupled to bus 603 can receive the data carried in the infrared signal and place the data on bus 603. Bus 603 carries the data to main memory 607, from which processor 605 retrieves and executes the instructions. The instructions received by main memory 607 may optionally be stored on storage device 611 either before or after execution by processor 605.

Computer system 601 also includes a communication interface 619 coupled to bus 603. Communication interface 619 provides a two-way data communication coupling to a network link 621 that is connected to a local network 623. For example, communication interface 619 may be a network interface card to attach to any packet switched local area network (LAN). As another example, communication interface 619 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 619 sends and receives electrical, electromagnetic or optical signals that carry digital data streams representing various types of information.

Network link 621 typically provides data communication through one or more networks to other data devices. For example, network link 621 may provide a connection through local network 623 to a host computer 625 or to data equipment operated by a service provider, which provides data communication services through a communication network 627 (e.g., the Internet). LAN 623 and network 627 both use electrical, electromagnetic or optical signals that carry digital data streams. The signals through the various networks and the signals on network link 621 and through communication interface 619, which carry the digital data to and from computer system 601, are exemplary forms of carrier waves transporting the information. Computer system 601 can transmit notifications and receive data, including program code, through the network(s), network link 621 and communication interface 619.

The techniques described herein provide an approach for designing space-time overlays. The algebraic framework to construct these convolutional space-time overlays that achieve full spatial diversity in quasi-static fading channels without altering the signal transmitted from the first antenna is developed. For BPSK modulated systems, a general approach for constructing space-time overlay codes with the same trellis complexity as the code used in the single antenna system is provided. The general approach for QPSK modulated systems involves the use of systematic inner space-time codes that utilize separate soft input/soft output decoders at the receiver. For QPSK modulated systems using rate 1/n binary convolutional codes with Gray mapping, an alternative space-time construction with the same trellis complexity as the single dimensional convolutional code is developed. The space-time overlay codes provide improved system throughput, while minimizing receiver complexity.

Obviously, numerous modifications and variations of the present invention are possible in light of the above teachings. It is therefore to be understood that within the scope of the appended claims, the invention may be practiced otherwise than as specifically described herein.

REFERENCES

[1] V. Tarokh, N. Seshadri, and A. R. Calderbank. Space-Time Codes for High Data Rate Wireless Communication: Performance Criterion and Code Construction. *IEEE Trans. Info. Theory*, IT-44:774-765, March 1998.

[2] V. Tarokh, H. Jafarkhani, and A. R. Calderbank. Space-Time Block Codes from Orthogonal Designs. *IEEE Trans. Info. Theory*, IT-45:1456-1467, July 1999.

[3] J. Hagenauer. The Turbo Principle: Tutorial Introduction and State of the Art. *International Symposium on Turbo Codes and Related Topics*, Brest-France:1-9, September 1997.

[4] E. Biglieri, G. Caire, and G. Taricco. Limiting Performance for Block-Fading Channels with Multiple Antennas. submitted to *IEEE Trans. Info. Theory*, September 1999.

[5] A. Lapidoth. The Performance of Convolutional Codes on the Block Erasure Channel Using Various Finite Interleaving Techniques. *IEEE Trans. Info. Theory*, IT-43:1459-1473, September 1997.

What is claimed is:

1. A method for encoding signals for transmission over a plurality of transmit antennas, the method comprising:
   generating a code word having a construction specifying a space-time overlay having a constraint that provides full spatial diversity over a communication channel having block fading characteristics without altering a signal transmitted from a first one of the transmit antennas, wherein the signal represents the code word, and wherein the constraint includes $[c_1^{(s)}, c_2^{(s)}, \ldots, c_{n-1}^{(s)}, c_n^{(s)}] = [c_1^{(1)}, c_2^{(1)}, \ldots, c_{n-1}^{(1)}, c_n^{1}]$,
   wherein $c_t^{(i)}$ is a code symbol assigned to an i-th one of the transmit antennas at time t, and s is a baseband version of the code word.

2. The method according to claim 1, wherein the plurality of transmit antennas form an upgraded antenna system based on a single antenna, and the transmitted signal is identical to that transmitted from the single antenna.

3. The method according to claim 1, wherein the construction is further based on a single dimensional binary code.

4. The method according to claim 1, further comprising:
   modulating the code word using BPSK (binary phase-shift keying) modulation or QPSK (quadrature phase-shift keying) modulation,
   wherein the construction further specifies that every non-code word is a matrix of full rank over a binary field.

5. The method according to claim 1, further comprising:
   transmitting the code word via the plurality of transmit antennas to a plurality of receive antennas, wherein the number of receive antennas is less than the number of transmit antennas.

6. The method according to claim 1, wherein the code word is convolutionally encoded.

7. An apparatus for encoding signals for transmission over a plurality of transmit antennas, the apparatus comprising:
   an encoder configured to generate a code word having a construction specifying a space-time overlay having a constraint that provides full spatial diversity over a communication channel having block fading characteristics without altering a signal transmitted from a first one of the transmit antennas, wherein the signal represents the code word, and wherein the constraint includes $[c_1^{(s)}, c_2^{(s)}, \ldots, c_{n-1}^{(s)}, c_n^{(s)}] = [c_1^{(1)}, c_2^{(1)}, \ldots, c_{n-1}^{(1)}, c_n^{1}]$, wherein $c_t^{(i)}$ is a code symbol assigned to an i-th one of the transmit antennas at time t, and s is a baseband version of the code word.

8. The apparatus according to claim 7, wherein the plurality of transmit antennas form an upgraded antenna system based on a single antenna, and the transmitted signal is identical to that transmitted from the single antenna.

9. The apparatus according to claim 7, wherein the construction is further based on a single dimensional binary code.

10. The apparatus according to claim 7, further comprising:
a modulator coupled to the encoder and configured to modulate the code word using BPSK (binary phase-shift keying) modulation or QPSK (quadrature phase-shift keying) modulation,
wherein the construction further specifies that every non-code word is a matrix of full rank over a binary field.

11. The apparatus according to claim 7, wherein the code word is transmitted via the plurality of transmit antennas to a plurality of receive antennas, wherein the number of receive antennas is less than the number of transmit antennas.

12. The apparatus according to claim 7, wherein the code word is convolutionally encoded.

13. A method for decoding, comprising:
receiving a signal transmitted over a communication channel from a plurality of transmit antennas, wherein the signal represents a code word having a construction specifying a space-time overlay having a constraint that provides full spatial diversity over the communication channel without altering a signal transmitted from a first one of the transmit antennas, the communication channel having block fading characteristics; and
decoding the code word, wherein the constraint includes $$[c_1^{(s)}, c_2^{(s)}, \ldots, c_{n-1}^{(s)}, c_n^{(s)}] = [c_1^{(1)}, c_2^{(1)}, \ldots, c_{n-1}^{(1)}, c_n^{1}],$$

wherein $c_t^{(i)}$ is a code symbol assigned to an i-th one of the transmit antennas at time t, and s is a baseband version of the code word.

14. The method according to claim 13, wherein the plurality of transmit antennas form an upgraded antenna system based on a single antenna, and the transmitted signal is identical to that transmitted from the single antenna.

15. The method according to claim 13, wherein the construction is further based on a single dimensional binary code.

16. The method according to claim 13, further comprising:
demodulating the received signal using BPSK (binary phase-shift keying) demodulation or QPSK (quadrature phase-shift keying) demodulation,
wherein the construction further specifies that every non-code word is a matrix of full rank over a binary field.

17. The method according to claim 13, wherein the signal is received at one or more receive antennas, wherein the number of receive antennas is less than the number of transmit antennas.

18. The method according to claim 13, wherein the code word is convolutionally encoded.

19. An apparatus for decoding, the apparatus comprising:
one or more receive antennas configured to receive a signal transmitted over a communication channel from a plurality of transmit antennas, wherein the signal represents a code word having a construction specifying a space-time overlay having a constraint that provides full spatial diversity over the communication channel without altering a signal transmitted from a first one of the transmit antennas, the communication channel having block fading characteristics; and a decoder is configured to decode the code word, wherein the constraint includes $$[c_1^{(s)}, c_2^{(s)}, \ldots, c_{n-1}^{(s)}, c_n^{(s)}] = [c_1^{(1)}, c_2^{(1)}, \ldots, c_{n-1}^{(1)}, c_n^{1}],$$

wherein $c_t^{(i)}$ is a code symbol assigned to an i-th one of the transmit antennas at time t, and s is a baseband version of the code word.

20. The apparatus according to claim 19, wherein the plurality of transmit antennas form an upgraded antenna system based on a single antenna, and the transmitted signal is identical to that transmitted from the single antenna.

21. The apparatus according to claim 19, wherein the construction is further based on a single dimensional binary code.

22. The apparatus according to claim 19, further comprising:
a demodulator configured to demodulate the received signal using BPSK (binary phase-shift keying) demodulation or QPSK (quadrature phase-shift keying) demodulation,
wherein the construction further specifies that every non-code word is a matrix of full rank over a binary field.

23. The apparatus according to claim 19, wherein the number of receive antennas is less than the number of transmit antennas.

24. The apparatus according to claim 19, wherein the code word is convolutionally encoded.

* * * * *